(12) United States Patent
Oh et al.

(10) Patent No.: US 11,102,797 B2
(45) Date of Patent: Aug. 24, 2021

(54) METHOD AND DEVICE FOR OPERATING PLURALITY OF FRAME STRUCTURES IN MOBILE COMMUNICATION SYSTEM

(71) Applicant: Samsung Electronics Co., Ltd., Gyeonggi-do (KR)

(72) Inventors: Jinyoung Oh, Seoul (KR); Younsun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 7 days.

(21) Appl. No.: 16/074,653

(22) PCT Filed: Feb. 3, 2017

(86) PCT No.: PCT/KR2017/001226
§ 371 (c)(1),
(2) Date: Aug. 1, 2018

(87) PCT Pub. No.: WO2017/135760
PCT Pub. Date: Aug. 10, 2017

(65) Prior Publication Data
US 2019/0037580 A1    Jan. 31, 2019

(30) Foreign Application Priority Data

Feb. 5, 2016 (KR) ............ 10-2016-0014945

(51) Int. Cl.
*H04W 72/12* (2009.01)
*H04L 5/00* (2006.01)
(Continued)

(52) U.S. Cl.
CPC ............ *H04W 72/12* (2013.01); *H04B 7/26* (2013.01); *H04L 5/00* (2013.01); *H04L 5/14* (2013.01);
(Continued)

(58) Field of Classification Search
CPC . H04W 72/12; H04W 72/04; H04W 72/0446; H04L 5/00; H04L 5/14; H04B 7/26
See application file for complete search history.

(56) References Cited

U.S. PATENT DOCUMENTS

2009/0232085 A1    9/2009    Boyer et al.
2011/0002320 A1    1/2011    Yuk et al.
(Continued)

FOREIGN PATENT DOCUMENTS

KR    1020110003463    1/2011
KR    1020150023778    3/2015
(Continued)

OTHER PUBLICATIONS

NTT DOCOMO, Inc., "Introduction of Additional TDD UL/DL Configuration in Rel-12", RP-131781, 3GPP TSG-RAN #62, Dec. 3-6, 2013, 11 pages.

(Continued)

*Primary Examiner* — Mandish K Randhawa
(74) *Attorney, Agent, or Firm* — The Farrell Law Firm, P.C.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A scheduling method by a base station in a wireless communication system, the method comprising receiving a message including capability information from a first terminal and a second terminal, setting a first secondary cell having a first frame structure to the first terminal, and setting a second secondary cell having a second frame structure to the second terminal, based on the capability information and performing scheduling for the first secondary cell and second secondary cell, wherein in the second frame structure, all subframes are at (Continued)

least one of a downlink subframe, an uplink subframe, and an empty subframe.

12 Claims, 16 Drawing Sheets

(51) Int. Cl.
*H04W 72/04* (2009.01)
*H04B 7/26* (2006.01)
*H04L 5/14* (2006.01)

(52) U.S. Cl.
CPC ....... *H04W 72/04* (2013.01); *H04W 72/0446* (2013.01)

(56) References Cited

U.S. PATENT DOCUMENTS

| | | |
|---|---|---|
| 2012/0327821 A1 | 12/2012 | Lin et al. |
| 2015/0016316 A1 | 1/2015 | Zhang |
| 2015/0162979 A1 | 6/2015 | Yuk et al. |
| 2015/0289261 A1* | 10/2015 | Oizumi ................. H04W 72/02 370/329 |
| 2017/0086170 A1* | 3/2017 | Takeda ................. H04L 5/1415 |

FOREIGN PATENT DOCUMENTS

| | | |
|---|---|---|
| WO | WO 2010093180 | 8/2010 |
| WO | WO 2016089129 | 6/2016 |

OTHER PUBLICATIONS

Lenovo, "Frame Structure for LAA SCells Supporting Both DL and UL Transmissions", R1-156735, 3GPP TSG RAN WG1 Meeting #83, Nov. 15-22, 2015, 4 pages.

European Search Report dated Nov. 23, 2018 issued in counterpart application No. 17747805.4-1214, 9 pages.

PCT/ISA/210 Search Report issued on PCT/KR2017/001226 (pp. 3).

PCT/ISA/237 Written Opinion issued on PCT/KR2017/001226 (pp. 6).

* cited by examiner f2 ns and Korean Patent
METHOD AND DEVICE FOR OPERATING PLURALITY OF FRAME STRUCTURES IN MOBILE COMMUNICATION SYSTEM

PRIORITY

This application is a National Phase Entry of PCT International Application No. PCT/KR2017/001226 which was filed on Feb. 3, 2017, and claims priority to Korean Patent Application No. 10-2016-0014945, which was filed on Feb. 5, 2016, the content of each of which is incorporated herein by reference.

TECHNICAL FIELD

The present invention relates to a method for simultaneously operating a plurality of different frame structures in the same frequency band or one cell at a mobile communication system base station that operates in a licensed band or an unlicensed band.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, the present invention proposes a method for maximizing a downlink transfer rate by minimizing the scheduling of uplink subframe at a base station with respect to a terminal having little or no uplink data to be transmitted in a mobile communication system.

DISCLOSURE OF INVENTION

Technical Problem

The present invention proposes a method for increasing the frequency efficiency by simultaneously operating a plurality of different frame structures in the same frequency band or one cell in a mobile communication system base station.

Solution to Problem

According to an embodiment of the present invention for achieving the above, a base station or cell sets one frame structure corresponding to each terminal to the terminal, based on characteristics of the terminal that communicates with the base station, and thereby simultaneously operates one or more frame structures in the same base station or cell.

Advantageous Effects of Invention

According to the present invention, a base station of mobile communication system can efficiently use time and frequency resources for downlink and uplink transmission by simultaneously operating a plurality of different frame structures in the same frequency band or one cell.

MODE FOR THE INVENTION

Figure 1A:
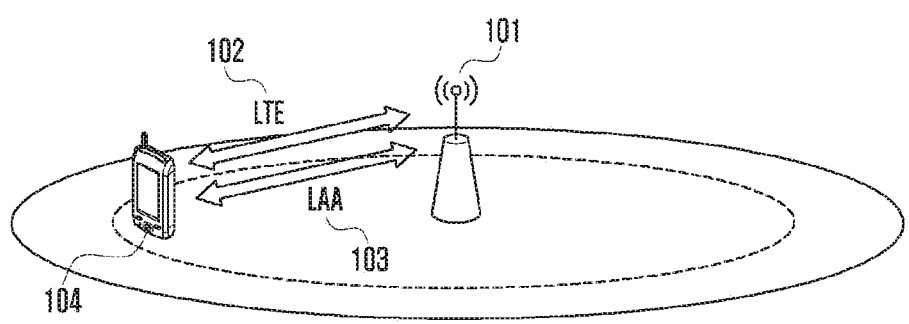
FIGS. 1A and 1B are diagrams illustrating a communication system to which the present invention is applied.

Hereinafter, preferred embodiments of the present invention will be described in detail with reference to the accompanying drawings. In the following description of the present invention, detailed description of known functions or structures will be omitted when it may make the subject matter of the present invention rather unclear. The terms used herein are defined in consideration of functions of the present invention and may be varied according to the intention of the user, the operator, or the like. Therefore, the definition should be based on the contents throughout this specification.

Although a long term evolution (LTE) system and an LTE-advanced (LTE-A) system are described exemplarily in this disclosure, the present invention is applicable to any other communication system that performs communication by using a license band and an unlicensed band. In addition, although the following description is made on the assumption that a base station or cell that performs communication by using the license band or unlicensed band is set and operated as Scell, the present invention is applicable to other case where a cell that operates in the licensed band or unlicensed band is set and operated as PCell or PSCell. Also, in this disclosure, a base station or cell that performs communication by using the licensed band will be referred to as an LTE SCell, an LTE cell, an LTE base station, or a base station, and also a base station or cell that performs communication by using the unlicensed band will be referred to as an LAA SCell, an LAA cell, an LAA base station, or a base station. Similarly, a terminal that performs communication by using the licensed band will be referred to as an LTE terminal, LTE UE, UE, or a terminal, and also a terminal that performs communication by using the unlicensed band may be referred to as an LAA terminal, LAA UE, UE, or a terminal.

Additionally, in this disclosure, when a part of OFDM symbols in a subframe used for general LTE communication is used for transmission of a control signal, a control channel, or a data channel, this will be referred to as a partial subframe. For example, if a subframe of 1 ms is composed of 14 OFDM symbols (0, 1, 2, . . . , 13 OFDM symbols), the partial subframe may refer to a subframe part of using 0~k1 OFDM symbols (k1<13) or using k2~13 OFDM symbols (k2>0, e.g., when k2=7, from the second slot) to transmit the control signal, the control channel, or the data channel In addition, although the following description is made using only a carrier aggregation (CA) environment for convenience of explanation, the present invention is applicable to a stand-alone environment that operates only in a dual-connectivity or unlicensed band. In addition, although the following description assumes, for convenience of explanation, a case where an LAA cell transmits a downlink control signal or channel or a downlink data channel to an LAA terminal by using the unlicensed band, the present invention is applicable to a case where the LAA terminal transmits an uplink control signal or channel or an uplink data channel to the LAA cell by using the unlicensed band.

Recent wireless communication systems that have provided an initial voice-oriented service are now evolving into high-speed, high-quality wireless packet data communication systems to offer a data service and a multimedia service. In order to support such high-speed, high-quality wireless packet data transmission services, various mobile communication standards such as high speed downlink packet access (HSDPA), high speed uplink packet access (HSUPA), long term evolution (LTE), or long term evolution advanced (LTE-A) of the 3rd generation partnership project (3GPP), high rate packet data (HRPD) of 3GPP2, and 802.16 of institute of electrical and electronics engineers (IEEE). In particular, LTE/LTE-A/LTE-A-Pro (hereinafter, LTE) continues to develop and evolve standards to improve system capacity and frequency efficiency. Typically, the LTE system can significantly increase a data transfer rate and system capacity, depending on a usable frequency bandwidth, by using a carrier aggregation (CA) technique capable of operating a system through a plurality of frequency bands.

However, a frequency band currently used by the LTE system is a licensed band (also referred to as a licensed spectrum or a licensed carrier) that can be used exclusively by a specific operator. However, since a frequency band (e.g., 5 GHz or less) that provides in general a mobile communication service has been already used by another operator or another communication system, it is difficult for a mobile communication operator to secure a plurality of licensed band frequencies. Thus, in order to efficiently process explosively increasing mobile data in such an environment where it is difficult to secure the license band frequency, techniques (e.g., LTE-U: LTE in unlicensed, LAA: Licensed-Assisted Access) for utilizing the LTE system in an unlicensed band (also referred to as an unlicensed spectrum or an unlicensed carrier) has been studied recently. The unlicensed band does not allow a specific operator or system to exclusively use a specific band and instead allows all allowable communication devices to share the same frequency band. In the unlicensed band, the 5 GHz band is used by a relatively smaller number of communication devices than the 2.4 GHz band, and allows the utilization of a very wide bandwidth. Therefore, this is a frequency band that is easy to secure additional frequency bands. That is, if the licensed and unlicensed band frequencies are utilized using LTE technique that uses a plurality of aggregated frequency bands, namely, CA technique, it is possible to easily increase system capacity. In other words, by setting an LTE cell in the licensed band to PCell (or Pcell) and setting an LTE cell (LAA cell or LTE-U cell) in the unlicensed band to SCell (or Scell) through the CA technique, it is possible to operate the LTE system in both the licensed and unlicensed bands. In this case, although the system is applicable to a dual-connectivity environment with a non-ideal backhaul for connection between the licensed and unlicensed bands as well as to a CA environment with an ideal backhaul for connection between the licensed and unlicensed bands, the present invention will be described using the CA environment in which the ideal backhaul is connected between the license and unlicensed bands.

Figure 1B:
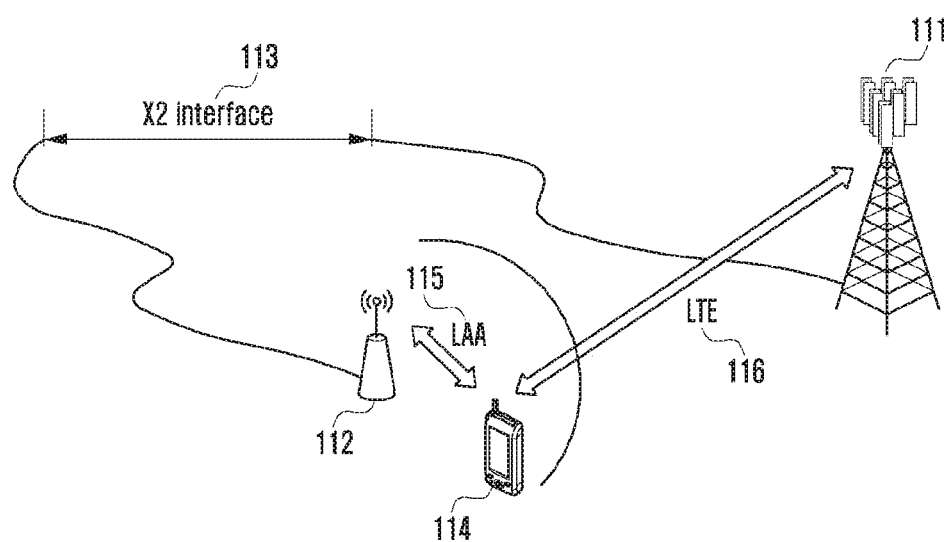

FIGS. 1A and 1B are diagrams illustrating a communication system to which the present invention is applied.

A description will be given with reference to FIGS. 1A and 1B. FIG. 1A shows a network in which an LTE cell 102 and an LAA cell 103 coexist for a small base station 101. A terminal 104 transmits and receives data to and from the base station 101 through the LTE cell 102 and the LAA cell 103. It may be assumed that a cell performing a data transmission/reception operation by using a licensed band is the LTE cell 102 or a PCell and also a cell performing a data transmission/reception operation by using an unlicensed band is the LAA cell 103 or SCell. However, uplink transmission may be limited to being performed only through the LTE cell 102 when the LTE cell is PCell.

FIG. 1B shows a network in which an LTE macro base station 111 for wide coverage and an LAA small base station 112 for increasing data transmission amount are installed. In this case, the LTE macro base station 111 may be replaced with an LTE small base station. Also, uplink transmission may be set to be performed only through the LTE base station 111 when the LTE base station is PCell. In this case, it is assumed that the LTE base station 111 and the LAA base station 112 have an ideal backhaul network. Therefore, a fast X2 communication 113 between base stations is allowed, and even if the uplink transmission is made only for the LTE base station 111, the LAA base station 112 may receive related control information from the LTE base station 111 in real time via the X2 communication 113. Schemes proposed by the present invention are applicable to all the systems shown in FIGS. 1A and 1B.

Figure 2A:
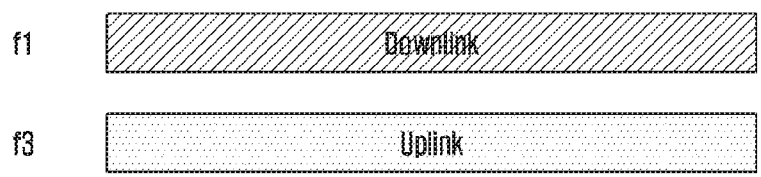
FIG. 2A is a diagram illustrating a first frame structure in an LTE system.
Figure 3:
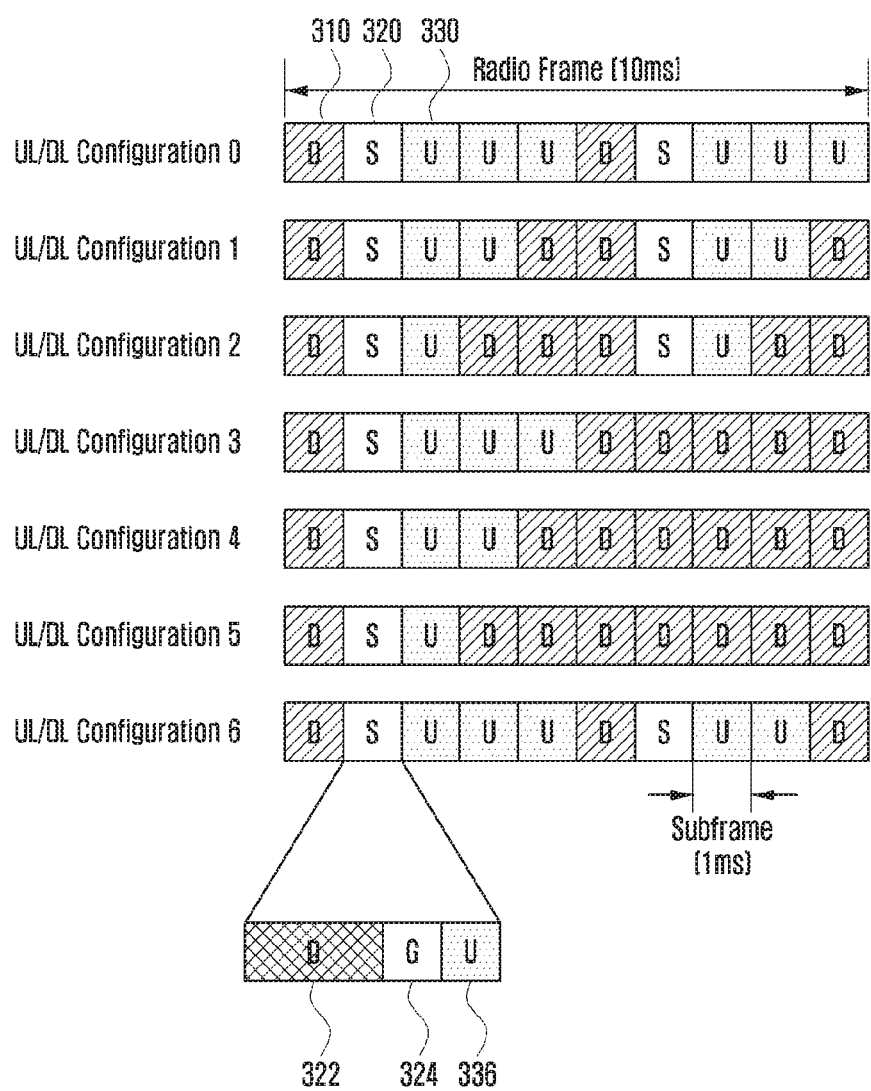
FIG. 3 is a diagram illustrating a detailed example of the second frame structure.

Although there is no restriction on a duplex scheme of the LTE cell 102, the current LTE/LTE-A/LTE-A-Pro (hereinafter, LTE) standard supports both a first frame structure (or FDD, or Frame Structure (FS) type 1) for a duplex scheme in which a downlink transmission of a base station and an uplink transmission of a terminal are performed in different frequency bands as shown in FIG. 2A, and a second frame structure (or TDD, or Frame Structure (FS) type 2) for a duplex scheme in which a downlink transmission of a base station and an uplink transmission of a terminal are performed in the same frequency band. As shown in FIG. 3, in the LTE standard, the second frame structure has seven different configurations formed of uplink, downlink, and special subframes 330, 310, and 320. The special subframe 320 is composed of a downlink pilot time slot (DwPTS) 322, a guard time (GT) 324, and an uplink pilot time slot (UpPTS) 326. In the DwPTS, the transmission of a downlink control signal, control channel, and data channel is possible. In the UpPTS, the transmission of a physical random access channel (PRACH) for uplink synchronization acquisition or of a sounding reference signal (SRS) for uplink channel estimation is possible. In the GT, no signal is transmitted.

Figure 4:
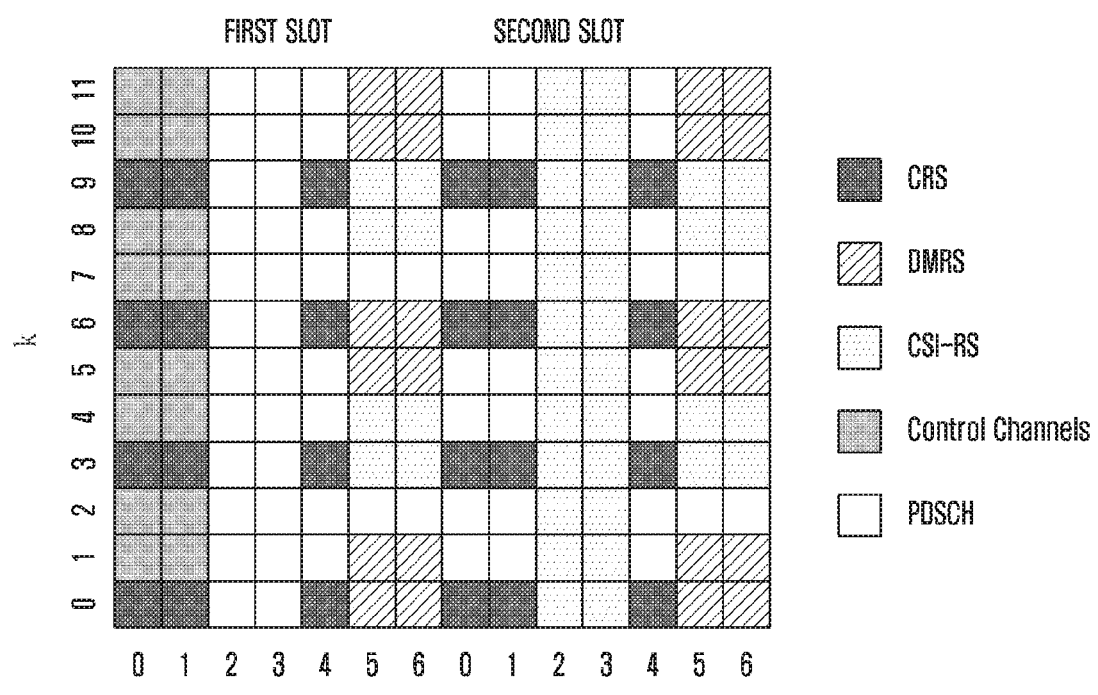
FIG. 4 is a diagram illustrating a radio resource configuration of an LTE system.

Generally, the LTE/LTE-A system transmits data by using an orthogonal frequency division multiple access (OFDM) transmission scheme. In the OFDM scheme, a modulated signal is located in a two-dimensional resource composed of time and frequency. The resources on the time axis are distinguished by different OFDM symbols, which are orthogonal to each other. The resources on the frequency axis are distinguished by different subcarriers, which are also orthogonal to each other. That is, in the OFDM scheme, if a specific OFDM symbol is designated on the time axis and if a specific subcarrier is designated on the frequency axis, one minimum unit resource is indicated. This is referred to as a resource element (RE). Different REs are orthogonal to each other even though passing through a frequency selective channel, so that signals transmitted in different REs can be received at the receiving side without mutual interference. In the OFDM communication system, a downlink bandwidth is composed of a plurality of resource blocks (RBs), and each physical resource block (PRB) may be composed of 12 subcarriers arranged along the frequency axis and 7 or 6 OFDM symbols arranged along the time axis as shown in FIG. 4. A subframe on the time axis is composed of two slots having a length of 0.5 msec, i.e., a first slot and a second slot, as shown in FIG. 4. In the radio resource shown in FIG. 4, a plurality of different types of signals may be transmitted as follows.

1. Cell Specific RS (CRS): This is a reference signal transmitted periodically for all terminals belonging to one cell and can be commonly used by a plurality of terminals.

2. Demodulation Reference Signal (DMRS): This is a reference signal transmitted for a specific terminal and is transmitted only when data is transmitted to that terminal. The DMRS may be composed of a total of 8 DMRS ports. In LTE/LTE-A, ports 7 to 14 correspond to the DMRS ports, which maintain orthogonality so as not to interfere with each other by using CDM or FDM.

3. Physical Downlink Shared Channel (PDSCH): This is a data channel transmitted in the downlink and used by a base station to transmit traffic to a terminal. This is transmitted using an RE through which no reference signal is transmitted in the data region of FIG. 4.

4. Channel Status Information Reference Signal (CSI-RS): This is a reference signal transmitted for terminals belonging to one cell and is used for measuring a channel status. A plurality of CSI-RSs may be transmitted in one cell. In the LTE-A system, one CSI-RS may correspond to one, two, four, or eight antenna ports.

5. Other control channels (PHICH, PCFICH, and PDCCH): These are used to provide control information necessary for a terminal to receive PDSCH or to transmit ACK/NACK for HARQ operation for uplink data transmission.

A physical dedicated control channel (PDCCH) region, which is a control channel region, and an enhanced PDCCH (ePDCCH) region, which is a data channel region, are transmitted separately on the time axis. This is for quickly receiving and demodulating a control channel signal. In addition, the PDCCH region is located over the entire downlink band, and one control channel is divided into small unit control channels distributed in the entire downlink band. The uplink is divided into a control channel (PUCCH) and a data channel (PUSCH). A response channel for a downlink data channel and other feedback information are transmitted through the control channel when there is no data channel, or through the data channel when there is the data channel.

Generally, one base station or cell sets one frame structure and performs communication with a terminal. For example, an LTE base station or LTE cell may set one of a first frame structure in which downlink and uplink are transmitted in different frequency bands (downlink f1 and uplink f3), or a second frame structure in which downlink and uplink are transmitted in the same frequency band f2. Then, the LTE base station or LTE cell may communicate with terminals belonging to the LTE base station or LTE cell through the set frame structure. In this case, even if there is no or little uplink data to be transmitted by a terminal, the LTE base station or LTE cell that sets the first frame structure may not use an uplink frequency resource for downlink transmission. This is inefficient. On the other hand, the LTE base station or LTE cell that sets the second frame structure may change the uplink and downlink subframe configuration in the second frame structure to be suitable for data transmission (downlink or uplink). For example, when there is no or little uplink data to be transmitted by a terminal, the LTE base station or LTE cell that sets the second frame structure may maximize necessary data transmission (downlink) by minimizing uplink subframes as in case of the UL/DL configuration 5 shown in FIG. 3. However, since one or more subframe is still used for uplink transmission, downlink transmission may not be performed in a time of 10% or more.

In the unlicensed band, a plurality of devices share in general the same frequency band or channel. In this case, the devices using the unlicensed band may be different systems. Therefore, for coexistence of various devices, the devices operating in the unlicensed band may use or may not use the unlicensed band or channel to perform communication, depending on whether the other devices use or not the channel Specifically, a transmitting device that requires transmission of signals including data or control signals in the unlicensed band or channel may check, before performing the signal transmission, whether the other devices occupy the channel with respect to the unlicensed band or channel, and thereby may or may not occupy the channel, depending on whether the other devices occupy the channel. This operation is typically referred to as listen-before-talk (LBT). Including a method and rule for sensing (listen) the unlicensed band or channel before transmitting (talk) in the band or channel, parameters required for a channel sensing operation may be defined in advance depending on regulations for a geographic region or frequency band or be defined or set according to each system. For example, in case of the United States, the unlicensed band may be used in the 5 GHz frequency band without any additional channel sensing operation other than an operation for radar detection.

A transmitting device that intends to use the unlicensed band may sense, through the above channel sensing operation (or LBT), whether other devices use the corresponding channel, and if channel occupancy of other devices is not sensed in the channel, may occupy and use the channel. In this case, devices using the unlicensed band may define or set in advance the maximum channel occupancy time that allows continuously occupying the channel after the channel sensing operation. The maximum channel occupancy time may be defined in advance depending on regulations defined according to the frequency band and geographic region, or may be separately set by a base station in case of a certain device, for example, a terminal. Also, the channel occupancy time may be set differently depending on the unlicensed band or region- or country-specific regulations. For example, in Japan, the maximum occupancy time in the unlicensed band of 5 GHz band is regulated as 4 ms. On the other hand, in Europe, the channel may be occupied continuously up to 10 ms or 13 ms. After performing the channel sensing operation, the device that occupies the channel determined as an idle channel for the maximum occupancy time may perform again the channel sensing operation for the channel and then, depending on the result of channel sensing, occupy again the channel for the maximum occupancy time.

Figure 5:
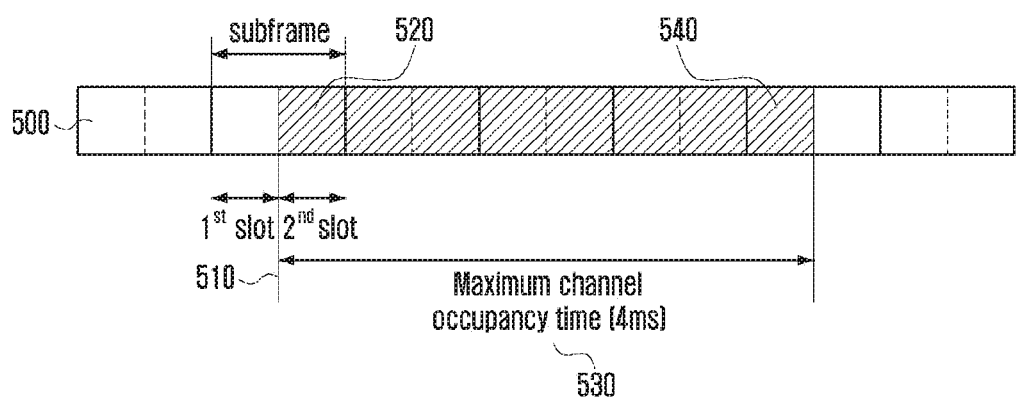
FIG. 5 is a diagram illustrating the maximum channel occupancy time in an unlicensed band.

Generally, a system using the unlicensed band may be regarded as having a TDD frame structure since the uplink and downlink are transmitted and received in the same frequency band. However, unlike a general LTE communication system or LTE cell that performs downlink or uplink transmission in unit of a designated subframe, an LAA cell that performs communication by using an LTE communication technique in the unlicensed band may perform uplink or downlink transmission by occupying the channel from an arbitrary subframe according to the result of channel sensing. That is, although the uplink and downlink transmission/reception performed in the same frequency band correspond to the characteristics of the second frame structure, the LAA cell that operates in the unlicensed band may be different from the second frame structure in which a specific subframe is always a downlink, uplink, or special subframe. Additionally, in case of the LAA cell or the LAA terminal, the downlink or uplink transmission may not always start or end in a subframe unit, depending on a termination point of the channel sensing operation at a transmitting node. For example, the downlink transmission operation of the LAA cell is as follows. As shown in FIG. 5, if it is determined through the channel sensing operation 500 in the LAA cell that the unlicensed band is in an idle state before a start 510 of a second slot in a subframe, the LAA cell may occupy the channel from the second slot 520 of the subframe and transmit a downlink signal. In this case, the maximum channel occupancy time 530 is limited after the channel sensing operation in the unlicensed band. Thus, in order for the LAA cell to use the entire maximum occupancy time (e.g., 4 ms, 530), the downlink transmission of the LAA cell may be terminated at a first slot 540 of a subframe. Therefore, a new, third frame structure is required to reflect the above characteristics.

The third frame structure is similar to the second frame structure in that the downlink and uplink transmissions are performed in the same frequency band. However, unlike the second frame structure, a subframe is not fixed to a downlink, uplink, or special subframe, and all subframes in a radio frame may be used as downlink subframes or uplink subframes or may be empty subframes in which no signal is transmitted. In addition, although the downlink and uplink transmissions are performed in different frequency bands as in case of the first frame structure, the third frame structure needs not be fixed like the first frame structure. Also, in the third frame structure, the downlink or uplink transmission may not start from the first symbol of each subframe or may not end at the last symbol of each subframe. For example, the downlink transmission may be performed in the first slot or the second slot in a subframe or using a DwPTS structure in a special subframe of the second frame structure. That is, in a DwPTS interval, the downlink transmission is performed at OFDM symbol indexes 0 to k1, where k1 may be set to one of 3, 6, 9, 10, 11, and 12. In addition, when transmitting the downlink in some symbols of a subframe by using the DwPTS structure as described above, the LAA cell may inform a terminal about a k1 value. Details of DwPTS refer to LTE standards TS36.211 and TS36.213. Similarly to the downlink transmission, the uplink transmission may be performed in the first or second slot of a subframe or in the remaining symbols except some symbols of a subframe (e.g., the remaining SC-FDMA symbols except the first or last SC-FDMA symbol). Therefore, a terminal that supports the third frame structure may not know which subframe is used by a base station or cell communicating using the third frame structure to perform downlink signal transmission. Thus, in case of a terminal that supports the third frame structure in the unlicensed band, a method for determining whether a base station or cell transmits a downlink signal is needed. For example, a terminal that supports the third frame structure may determine the existence or not of a CRS in each subframe (e.g., using CRS port 0 or CRS ports 0 and 1). If a CRS is detected, it may be determined that the subframe is used for downlink transmission. At this time, the CRS detection may be performed for a symbol in which at least one CRS exists. If a base station or cell that occupies the channel delivers in advance configuration information about the next subframe to terminals, for example, if the base station or cell notifies, to a terminal at the subframe n through a downlink control channel, the number of OFDM symbols (e.g., the number of downlink symbols that can be transmitted in DwPTS including 14 symbols) to be used as the downlink at the next subframe n+1 within the maximum channel occupancy interval, the terminal may not perform an operation of determining whether the downlink is transmitted for the subframe n+1, and may determine that the subframe is used for the downlink transmission. In this case, using other control channel (e.g., PCFICH) together with the CRS, the terminal may determine whether the base station or cell transmits the downlink.

Meanwhile, the transmission and reception of data by the LTE cell (LAA cell or LTE-U cell) in the unlicensed band, based on the second frame structure or the new, third frame structure, are merely one embodiment. Even in the licensed band, a terminal may be set with the third frame structure by a base station.

Specifically, if a terminal is set with the third frame structure by a base station in the licensed band and receives scheduling based on the third frame structure, the terminal may determine that a subframe scheduled by the base station is a downlink subframe, even though determining in each subframe the existence or not of a downlink signal including a CRS (e.g., using CRS port 0 or CRS ports 0 and 1).

Figure 6:
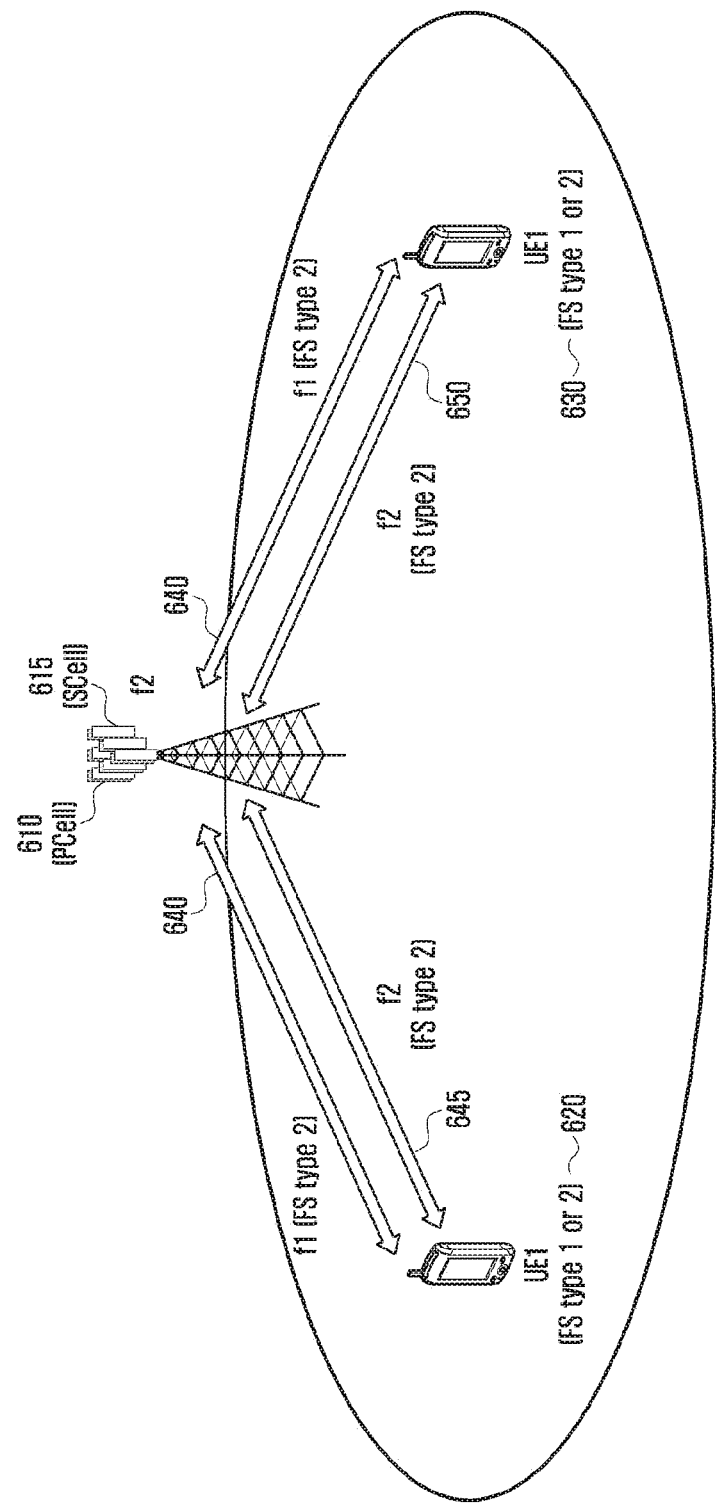
FIG. 6 is a diagram illustrating a communication system in which a base station sets SCell to a plurality of terminals.

Generally, a base station or cell sets one frame structure in one frequency band and communicates with a terminal according to the set frame structure. In addition, the frame structure set by the base station or cell is set equally to all terminals that communicate with the base station or cell. For example, as shown in FIG. 6, a base station or cell 610 communicates with a first terminal (UE 1) and a second terminal (UE 2) by using two frequency bands or two cells. In this case, it is assumed that the base station sets one cell as PCell and another cell as SCell to the first and second terminals. It is also assumed that frame structures of PCell and SCell use the second frame structure. In this case, PCell and SCell may have different frame structures. For example, the base station may set PCell with UL/DL configuration 5 and set SCell with UL/DL configuration 4.

In addition, the UL/DL configuration for the second frame structures of PCell and SCell may be set differently according to each cell or frequency band. Although FIG. 6 will be described on the assumption that both a base station and a terminal support and set up the second frame structure and that each cell has the same UL/DL configuration, this description may be applicable to a case where both the base station and the terminal support the first frame structure or a case where at least one of the base station and the terminal simultaneously supports the first and second frame structures. In addition, the base station that supports the second frame structure may set different UL/DL configurations according to respective cells or frequencies.

When the initial cell access of a terminal is made or when an idle mode is changed to an RRC connection state, a base station may receive information about characteristics or supportable functions of the terminal from the terminal through a PCell uplink signal or received from an upper network such as a mobility management entity (MME). Using a signal transmitted by a base station or cell found in a cell search process performed at the initial cell access, a terminal may determine the frame structure of the base station or cell. For example, in the LTE system, a terminal searches for a cell by using a synchronization signal (a primary synchronization signal, a secondary synchronization signal). Since the first and second frame structures have different positions of synchronization signal transmission, a terminal may determine the frame structure of the base station or cell, based on the position of a synchronization signal received from the found base station or cell. Alternatively, a terminal may receive the frame structure of a base station or cell from another base station or cell. For example, as shown in FIG. 6, it is assumed that the first terminal 620 and the second terminal 630 access PCell 610 through a cell search process and an initial cell access process and then perform communication. If a base station determines that it is required to set an additional bandwidth to the first and second terminals, the base station may further set SCell 615 for the first and second terminals. At this time, the terminal may be set with a frame structure of added SCell by the base station. That is, while instructing the terminal to add the new SCell 615, the base station delivers an index of SCell added through SCellToAddMod-r10, a physical cell ID, a downlink frequency band, and configuration information of the SCell (radioResourceConfigCommonSCell, radioResourceConfigDedicatedSCell) to the terminal through an upper signal. At this time, using tdd-Config included in information element (IE) of the radioResourceConfigCommonScell, the terminal can know the frame structure of the corresponding SCell. For example, the SCell has the second frame structure when a tdd-Config IE is set, and the SCell has the first frame structure when this IE is not set.

Figure 2B:
FIG. 2B is a diagram illustrating a second frame structure in an LTE system.

Uplink control information (e.g., channel state information, HARQ-ACK, HARQ-NACK, scheduling request information, etc.) of a terminal that communicates with SCell may be transmitted to an uplink control channel of Pcell or to a specific SCell in which uplink control channel transmission is set, depending on base station setup. That is, when uplink control channel transmission is not set to the added Scell and when terminals communicating with the SCell do not have separate uplink data channel transmission, or when uplink control channel transmission is not set to the added Scell and when the uplink data request amount of terminals communicating with the SCell is transmittable in an uplink data channel of PCell, the corresponding SCell may not need radio resource allocation for uplink control or data channel transmission. However, in case of the first frame structure as shown in FIG. 2A, one frequency band different from a downlink frequency band is allocated to uplink transmission, or in case of the second frame structure as shown in FIG. 2B, at least one uplink subframe always exist according to UL/DL subframe configuration. Therefore, even in case where the SCell needs no separate uplink signal transmission as above, the radio resource efficiency is low because frequency or time resources should be allocated to uplink transmission.

As described above, a base station knows in advance supportable frame structures of terminals before adding SCell, and the base station can set a frame structure for SCell to each terminal. If a base station or cell and a terminal are capable of supporting one or more frame structures, the base station or cell may set a plurality of frame structures to different terminals and thereby simultaneously operate the terminals to improve the radio resources efficiency. That is, a base station or cell that operates at one frequency and supports one or more frame structures may allocate a frame structure suitable for each terminal that communicates with the base station or cell, including a frame structure supportable in each terminal, depending on characteristics and capacities of the terminals. In case of simultaneously operating the terminals having different allocated frame structures, the radio resources may be used more efficiently without the minimum frequency or time resources that should be allocated for downlink or uplink transmission. This will be described with reference to FIG. 7.

Figure 7:
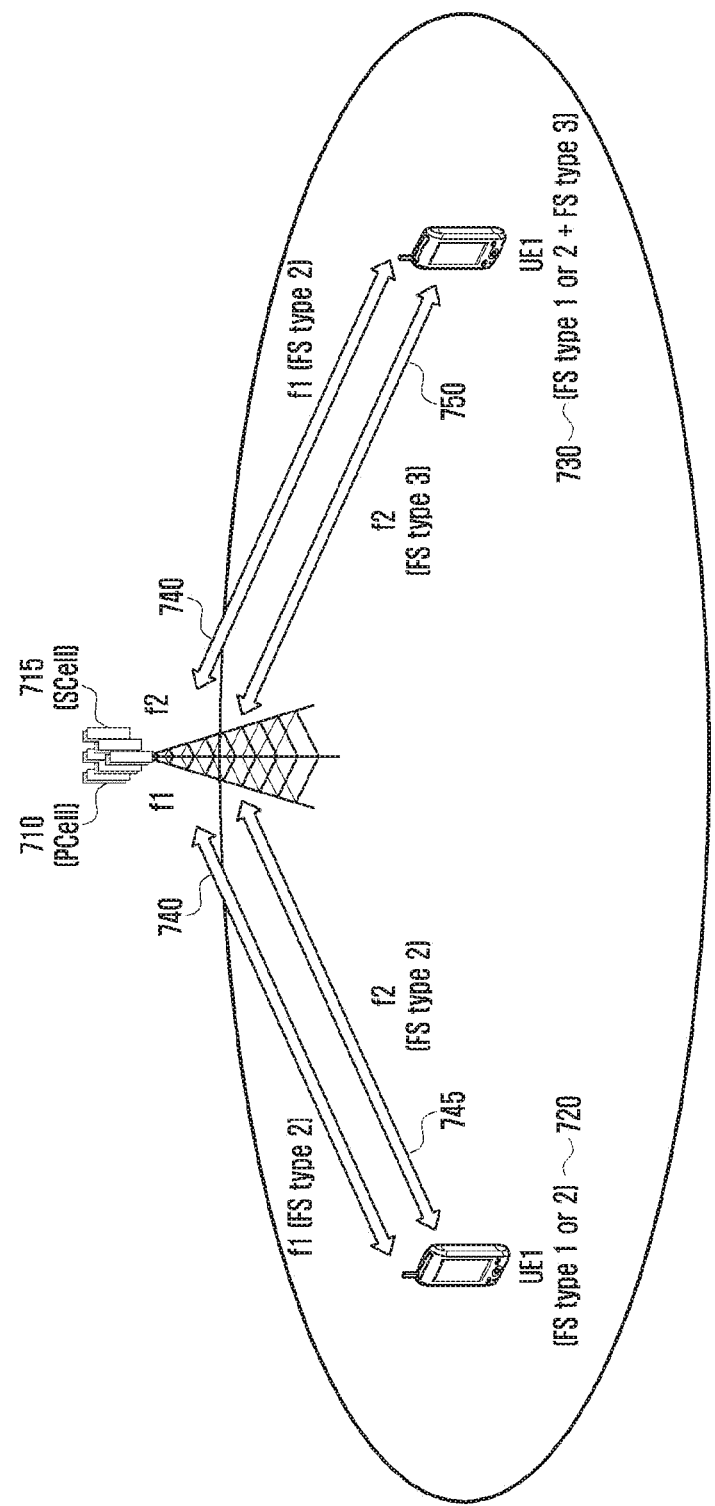
FIG. 7 is a diagram illustrating a communication system in which a base station sets SCell of a third frame structure to an arbitrary terminal.

As shown in FIG. 7, it is assumed that a first terminal (UE 1) 720 and a second terminal (UE 2) 730 access PCell 710 through a cell search process and an initial cell access process and then perform communication. If a base station determines that it is required to set an additional bandwidth to the first and second terminals, the base station may further set SCell 715 for the first and second terminals. In this case, it is assumed that the base station or SCell may further support a third frame structure in addition to at least one of the first frame structure and the second frame structure.

At this time, the terminal may be set with a frame structure of added SCell by the base station. That is, while instructing the terminal to add the new SCell 715, the base station delivers an index of SCell added through ScellToAddMod IE of RRCConnectionReconfiguration, a physical cell ID, a downlink frequency band, and configuration information of the SCell (radioResourceConfigCommonSCell and radioResourceConfigDedicatedSCell) to the terminal through an upper signal. Here, using tdd-Config contained in radioResourceConfigCommonScell IE, the terminal can know the frame structure of the corresponding SCell. For example, the SCell has the second frame structure when a tdd-Config IE is set, and the SCell has the first frame structure when this IE is not set. In case of a base station and a terminal that support the third frame structure, it may be determined that the SCell has the third frame structure by adding a new IE to the tdd-Config information or adding a new IE other than the tdd-Config. Also, through a separate IE set for the SCell by the base station, the terminal may determine that the SCell is set with the third frame structure. For example, if an IE such as configuration information LAA-ScellConfiguration for the third frame structure is included in SCell configuration information (radioResourceConfigDedicatedSCell), it may be determined that the SCell is set with the third frame structure. Alternatively, it may be determined through ARFCN-ValueEUTRA information of SCell dl-CarrierFreq IE added through SCellToAddMod-r10. The ARFCN-ValueEUTRA is information (EARFCN: E-UTRA Absolute Radio Frequency Channel Number) about uplink and downlink bands supportable by a base station and a terminal. For example, a band from 5150 MHz to 5925 MHz is defined as an E-UTRA operation band 46, and the band 46 may be defined as dedicated to the third frame structure or defined as using the third frame structure even though set as a TDD duplex. That is, if the ARFCN-ValueEUTRA information of the dell-CarrierFreq IE of SCell added through the SCellToAddMod is 46, the terminal that supports the third frame structure may determine that the SCell is set with the third frame structure. At this time, even if tdd-Config is included in the radioResourceConfigCommonSCell IE of the SCell 715, the terminal may determined that the frame structure of SCell is set as the third frame structure if the ARFCN-ValueEUTRA information of the SCell dl-CarrierFreq IE added through the SCellToAddMod-r10 is 46. That is, the terminal that supports the third frame structure may determine the frame structure of the SCell by using at least one of the EARFCN information set for the SCell, LAA-SCellConfiguration information, and tdd-Config information. Therefore, when one or more frame structures are to be operated simultaneously by the base station or SCell, some of the configuration information for the SCell may be set differently according to the supportable characteristics of the terminal.

A more detailed description with reference to FIG. 7 is as follows. The first terminal 720 and the second terminal 730 are set to add the SCell 715 through the SCellToAddMod-r10 IE of the RRCConnectionReconfiguration by the PCell 710 that operates with the second frame structure. In case of desiring to operate one or more frame structures in the SCell, at least one value of the upper signal IE regarding SCell configuration may be differently set for each terminal, depending on the supportable characteristics (e.g., UE capability, whether to support the third frame structure operation) of the first and second terminals 720 and 730. The first and second terminals 720 and 730 may be assigned different values of sCellIndex which is one of the SCellToAddMod IEs for the SCell 715, depending on the predetermined number of SCells or the like. However, a physCellId which is an actual cell ID for the SCell 715, and an ARFCN-ValueEUTRA value which is an operating frequency band should be set unvaried. In addition, tdd-Config (e.g., UL/DL configuration 5) may be set equally to the first and second terminals in the radioResourceConfigCommonSCell IE of the SCell 715, but the tdd-Config IE may not be set in case of the terminal that intends to set the third frame structure. If desiring to simultaneously operate one or more frame structures in the SCell 715, the base station may set an additional IE to the second terminal that supports the third frame structure. For example, the LAA-SCellConfiguration IE of radioResourceConfigDedicatedSCell may be further set to only the second terminal. Therefore, in this case, the first terminal may determine that the SCell 715 is SCell 745 operating with the second frame structure and the UL/DL configuration information 5, and the second terminal may determine that the SCell 715 is SCell 750 operating with the third frame structure.

Figure 8:
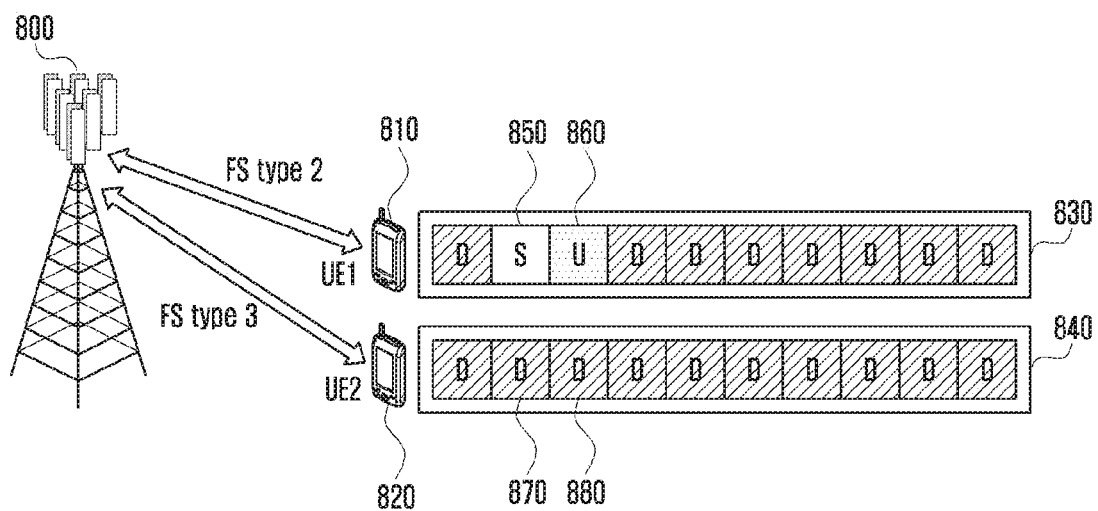
FIG. 8 is a diagram illustrating different frame structures that are set to terminals by a base station.

According to the technique proposed by the present invention and the example of FIG. 7, the SCell may set different frame structures to a terminal according to the characteristics and supportable functions of the terminal. That is, SCell 800 of FIG. 8 may set the second frame structure and UL/DL configuration information (e.g., UL/DL configuration 5 of a time division duplex frame structure) to a first terminal (UE 1) 810, and set the third frame structure to a second terminal (UE 2) 820. Therefore, since the first terminal 810 determines that the SCell 800 operates with the second frame structure and the UL/DL configuration information 5, the first terminal 810 assumes that a specific subframe in one radio frame is always set as one of downlink, special, and uplink subframes as indicated by 830 of FIG. 8. On the other hand, since the second terminal 820 determines that the SCell 800 operates with the third frame structure, the second terminal 820 assumes that all subframes in one radio frame are set as downlink or uplink subframes or empty subframes where no signal is transmitted as indicated by 840 of FIG. 8. In addition, for the first and second terminals 810 and 820, the base station may set the SCell 800 that operates with the second or third frame structure in the licensed band or unlicensed band.

In the LTE system, the terminal should receive scheduling for uplink signal transmission from the base station in order to transmit uplink data or control signals. In case of the first frame structure, the terminal may perform the uplink signal transmission using uplink time and frequency resources scheduled from the base station after 4 ms at the time of receiving the scheduling for the uplink signal transmission from the base station. Therefore, the terminal that does not receive the uplink scheduling information from the base station may regard each subframe as a downlink subframe or an empty subframe. Accordingly, the SCell 800 does not set the uplink scheduling in an uplink subframe 860 of the second frame structure to the terminal 810 set with the second frame structure, and may use time resources of the uplink subframe 860 in downlink transmission 880 of the terminal 820 set with the third frame structure.

The base station or SCell that uses the uplink transmission time resource for downlink transmission of the third frame structure without setting uplink transmission of the second frame structure as described above may not set uplink transmission of part or all of an uplink control signal (e.g., SRS), an uplink control channel (PRACH), and an uplink control channel (PUCCH) in the SCell for the terminals set with the second frame structure. For example, the SCell 800 may not set (or release) SoundingRS-UL-ConfigCommon of SCell configuration information (e.g., radioResourceConfigCommonSCell) to be transmitted to the terminal (e.g., the first terminal) set with the second frame structure so that the terminals set with the second frame structure may not perform uplink control signal transmission in the SCell. If the SCell 800 is not a cell set with PRACH transmission or a PSCell (or is not a ULSCell), the PRACH-Config IE of prach-ConfigSCell-r11 is not set. If the PRACH-Config IE of prach-ConfigSCell is not set, the prach-ConfigSCell IE may not be included in the SCell configuration information depending on selection of the base station. Even if the SCell is PSCell, the prach-ConfigSCell-r11 IE may or may not be included in the SCell configuration information according to selection of the base station. Since the prach-ConfigSCell IE may not be included in the SCell configuration information according to selection of the base station, the terminal may not be set with PRACH transmission for the SCell. If PUCCH transmission is set in the SCell, uplink control channel (PUCCH) transmission of the terminal set with the second frame structure may be performed in the SCell. Therefore, when SCell intends to transmit a downlink signal to the terminal set with the third frame structure at a time set as an uplink subframe in the second frame structure, the SCell should be a cell for which PUCCH transmission is not set.

Figure 9:
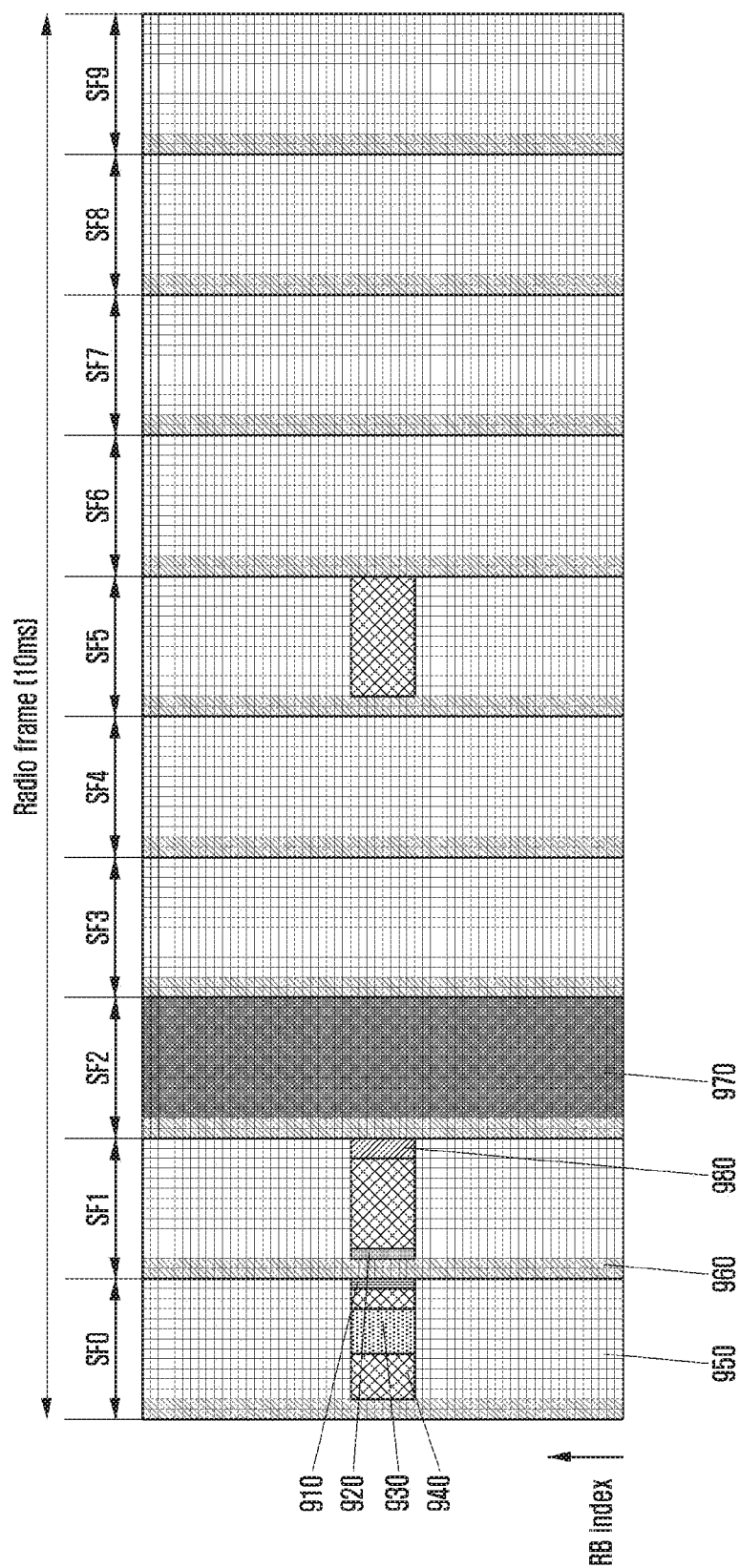
FIG. 9 is a diagram illustrating a frame structure indicating PSS, SSS, and PBCH transmission resource regions transmitted to a terminal by a base station.

A method for simultaneously operating one or more different frame structures in one base station or cell will be described with reference to FIG. 9. Specifically, a method of entirely using one radio frame for downlink transmission by operating the second and third frame structures in one cell will be described from the viewpoint of the base station. The base station or cell performs only downlink transmission without uplink transmission for terminals set with the third frame structure or does not perform uplink data scheduling and uplink control channel setup for such terminals. In case of the second frame structure, the UL/DL subframe configuration 5 having the greatest downlink subframe ratio and the special subframe configuration 4 having the greatest number of downlink transmittable symbols are used to maximize the downlink subframe which is set to terminals with the second frame structure. Here, the special subframe configuration 4 is composed of DwPTS of 12 OFDM symbols, guard time of 1 OFDM symbol, and UpPTS of one OFDM symbol capable of transmitting an uplink SRS signal. At this time, the cell may not set up or may release an IE for transmission of SRS in SCell configuration information of a terminal set with the second frame structure to restrict the uplink transmission of the terminals.

The base station or cell that operates the second and third frame structures in one cell and wants to entirely use one radio frame for downlink transmission may set differently the downlink data transmission of terminals set with the second and third frame structures, depending on the characteristics of each frame structure. For example, in the second frame structure, the base station and the terminal operate on the assumption that synchronization signals PSS 920 and SSS 910 and a physical broadcast channel (PBCH) 930 are transmitted through 6 middle RBs of a frequency band in SF0 and SF1. On the other hand, in the third frame structure, the base station and the terminal operate on the assumption that the synchronization signals PSS and SSS are transmitted through 6 middle RBs of a frequency band in SF0 and SF5 and the PBCH is not transmitted.

Therefore, the base station or cell that operates the second and third frame structures in one cell and wants to entirely use one radio frame for downlink transmission may set downlink data scheduling to terminals set with the second and third frame structures by considering the PSS, SSS, and PBCH transmission resource regions in each frame structure. That is, the base station or cell may prevent downlink transmission from being scheduled for the terminal set with the third frame structure in regions where the PSS, SSS, and PBCH of the second frame structure are transmitted. In this case, since synchronization with the base station or cell can be performed without detecting the PSS and SSS transmitted in SF0 and SF5 in the third frame structure, the PSS, SSS, and PBCH for the terminal set with the third frame structure may not be transmitted. At this time, if the third frame structure is set in the licensed band cell, the terminal may be set not to detect the PSS and SSS in the cell. That is, the base station or cell may set downlink data transmission 940 of the terminals set with the second frame structure at least through 6 middle RBs of SF0 and SF5. The terminal set with the second frame structure determines SF2 as a subframe set for uplink transmission. However, since transmission of control signals or control channels such as PUCCH, SRS, and PRACH is not set in the base station or SCell, the terminals may not perform operations related to uplink data transmission or downlink data reception in SF2 when the base station or SCell does not schedule the uplink data channel transmission in the SF2. On the other hand, since the terminal set with the third frame structure determines that SF2 is also an interval capable of downlink transmission, the SF2 may be used for downlink transmission of terminals set with the third frame structure. In addition, since the PSS 920 dedicated to the second frame structure is being transmitted from the base station or cell in a special subframe of the SF1, and since the terminal set with the second frame structure determines that a downlink transmittable interval of SF1 is 12 OFDM symbols, the 6 middle RBs in the special subframe SF1 may be set for downlink data transmission only to the terminal set with the second frame structure. In this case, since the 6 middle RBs of the subframe SF1 will not be scheduled to the terminal set with the third frame structure, the terminals set with the third frame structure may determine that the remaining frequency resources except the 6 middle RBs of the subframe SF1 are general downlink data transmission having 14 OFDM symbols. Also, it is possible to set the terminal set with the third frame structure to determine that the subframe SF1 is the downlink data transmission having 12 OFDM symbols. In this case, the base station or cell may notify in advance, at least in SF0 (or before one subframe from a subframe in which 14 OFDM symbols are applied), the terminals set with the third frame structure that SF1 is downlink transmission having a DwPTS structure of 12 OFDM symbols. In the remaining time and frequency resources 950 and 960 except the above-mentioned time and frequency regions (e.g., 6 middle RBs of SF0, SF1 and SF5, and SF2), the base station or cell may transmit the downlink control channel and the data channel to all the terminals set with the second and third frame structures.

If the base station or cell that operates the second and third frame structures in one cell and wants to entirely use one radio frame for downlink transmission may not schedule downlink transmission in transmission regions of the PSS, SSS and PBCH of the second frame structure for the terminal set with the third frame structure, and if the terminal set with the third frame structure does not detect the PSS and SSS transmitted in SF0 and SF5, the base station may transmit a discovery signal for the third frame structure for synchronization with a serving cell or a neighboring cell search and signal strength measurement (RSRP, RSRQ) for neighboring cells in the terminal set with the third frame structure. The discovery signal is composed of at least PSS, SSS, and CRS port 0, and the PSS and SSS positions may be the same as in FDD. That is, the SSS and PSS may be transmitted in the sixth and seventh symbols in a subframe, respectively. Since the PSS and SSS positions of the discovery signal are different from the PSS and SSS positions of the second frame structure terminal, the base station may transmit the discovery signal for the third frame structure in the uplink subframe of the second frame structure so that the terminals set with the second frame structure may not detect the discovery signal. In this case, the CRS in the discovery signal for the third frame structure transmitted in the uplink subframe may generate a CRS signal of the discovery signal with a subframe index or slot index for transmission of the discovery signal. If the discovery signal is transmitted in a subframe between SF0 and SF4, a CRS signal of the discovery signal may be generated with a subframe index or slot index for SF0. If the discovery signal is transmitted in a subframe between SF5 and SF9, a CRS signal of the discovery signal may be generated with a subframe index or slot index for SF5.

Using the method proposed in the present invention, the base station may use a dynamic UL/DL subframe configuration other than the predefined UL/DL subframe configuration as shown in FIG. 3. For example, the base station or cell capable of operating the second and third frame structures in one cell may dynamically change the UL/DL subframe configuration by operating an uplink subframe of the second frame structure for the uplink subframe of the terminal set with the second frame structure or for the downlink subframe of the terminal set with the third frame structure, depending on a need of the base station or cell. At this time, the UL/DL subframe configuration fixed in the second frame structure may be changed in unit of at least 10 ms through re-setup of UL/DL subframe configuration through an upper signal or an L1 signal. For example, assuming that the base station or cell that operates the second and third frame structures in one cell uses the UL/DL subframe configuration 0 of FIG. 3 in the second frame structure, the 3, 4, 5, 8, 9, and 10th subframes set as uplink subframes in the UL/DL subframe configuration 0 of the second frame structure may be used for downlink or uplink for the third frame structure terminal at any time, depending on setting of the base station.

Using the method proposed by the present invention, the base station may operate a plurality of systems or radio access technologies (RATs) having different characteristics or services (NB-IoT, eMTC, latency reduction, etc.) having different characteristics or numerologies in the same LTE system by distinguishing them on the time axis in the same base station or cell or frequency. For example, the LTE system operating with the second or third frame structure and a new mobile communication system 5G may be operated with divided time resources using the same frequency band. Specifically, it is possible to set the LTE system with the second frame structure, to use a downlink subframe of the second frame structure in the LTE system, and to use an uplink subframe of the second frame structure for downlink or uplink signal transmission in the new mobile communication system 5G. In this case, if the 5G system is operated in the uplink transmission subframe of the LTE system, the LTE system may not set uplink transmission of the second frame structure to the LTE terminal. Similarly, it is possible to set the LTE system with the second frame structure, to use a downlink subframe of the second frame structure in the general LTE mobile communication system, and to use an uplink subframe of the second frame structure for different functions (e.g., eMTC, NB-IoT, etc.) in the LTE-based system. In this case, the LTE system may be set with the third frame structure, and the new mobile communication system 5G may be used simultaneously on the same frequency. If another signal for the LTE system (e.g., CRS, PDCCH, PCFICH, or the like) is not detected, the terminal set with the third frame structure may not perform a process in the corresponding subframe. In addition, if any signal for the 5G system is not detected in the 5G system, the terminal does not perform a process in the corresponding subframe to operate simultaneously a plurality of systems or RATs having different characteristics by distinguishing time resources in one base station, cell, or frequency. Also, it is possible to operate simultaneously a plurality of systems or RATs having different characteristics by distinguishing time and frequency resources in one base station, cell, or frequency. For example, the base station or cell may operate the second and third frame structures depending on the characteristics of the LTE terminal, and may also operate the 5G system in the same base station or cell. In this case, the base station or cell may perform the downlink transmission or uplink reception operation of the third frame structure or 5G system in an uplink subframe of the second frame structure. In addition, the base station or cell may operate a plurality of systems in the same base station, cell, or frequency by distinguishing time and frequency resources, for example, by performing the downlink transmission or uplink reception operation of the third frame structure in a part of the frequency region in the uplink subframe and also performing the downlink transmission or uplink reception operation of the 5G system in the remaining frequency region. For example, assuming that the base station or cell that operates the second and third frame structures and the 5G system in one cell uses the UL/DL subframe configuration 0 of FIG. 3 in the second frame structure, the 3, 4, 5, 8, 9, and 10th subframes set as uplink subframes in the UL/DL subframe configuration 0 of the second frame structure may be used for downlink or uplink for the third frame structure terminal or the 5G terminals at any time, depending on setting of the base station.

Figure 10:
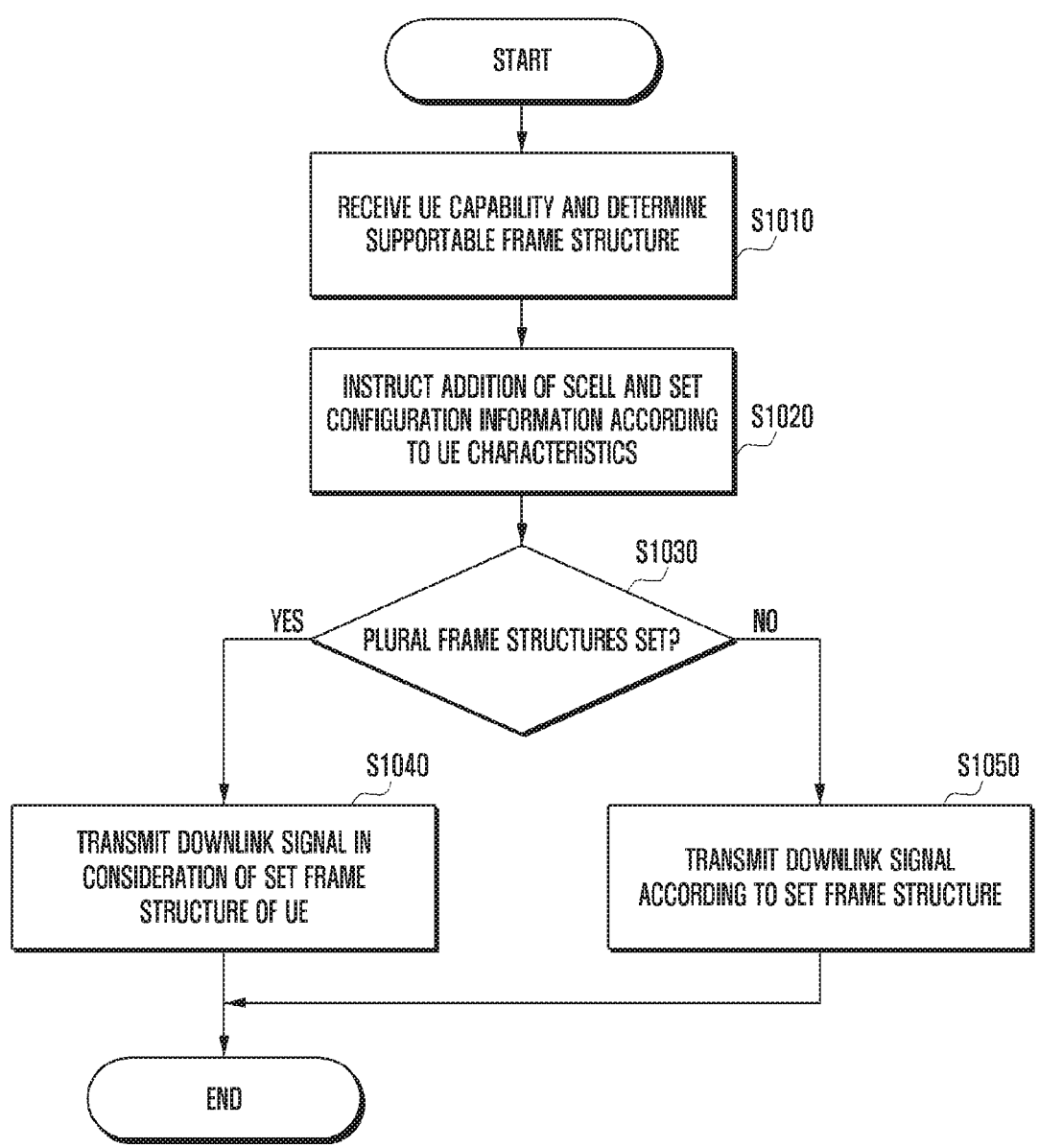
FIG. 10 is a flow diagram illustrating a method for a base station to transmit a downlink signal, based on a set frame structure.

FIG. 10 is a flow diagram illustrating an operation of a base station according to an embodiment of the present invention. At step S1010, the base station receives the capability of a terminal and determines a supportable frame structure for each terminal. Specifically, the base station may receive a message including information that explicitly indicates a frame structure supported by the terminal. For example, the base station may acquire information from the terminal that the terminal supports the second frame structure and the third frame structure.

Alternatively, categories of terminals that support the second frame structure and the third frame structure may be separately defined. For example, a category of terminals supporting only the second frame structure, a category of terminals supporting the second and third frame structures, and the like may be defined. Therefore, the base station may receive a message including information about the terminal category from the terminal.

On the other hand, based on the frame structure determined at step S1010, the base station instructs the terminal to add SCell at step S1020, and sets configuration information of the SCell including a frame structure of the SCell. For example, when the second frame structure is set, the uplink control signal or control channel transmission such as SRS transmission may not be set. If the SCell is set to operate with a plurality of frame structures at step S1030 through the above steps S1010 and S1020, the base station may perform downlink signal transmission to terminals at step S1040 by considering the characteristics of each frame structure set for each terminal. For example, 6 middle RBs of SF0, 1 and SF5 transmit the downlink data channel only to terminals set with the second frame structure. If the SCell is set not to operate with a plurality of frame structures at step S1030, the base station transmits the downlink data channel to all terminals at step S1050 according to the frame structure set without distinguishing the frame structure set to the terminal.

Figure 11:
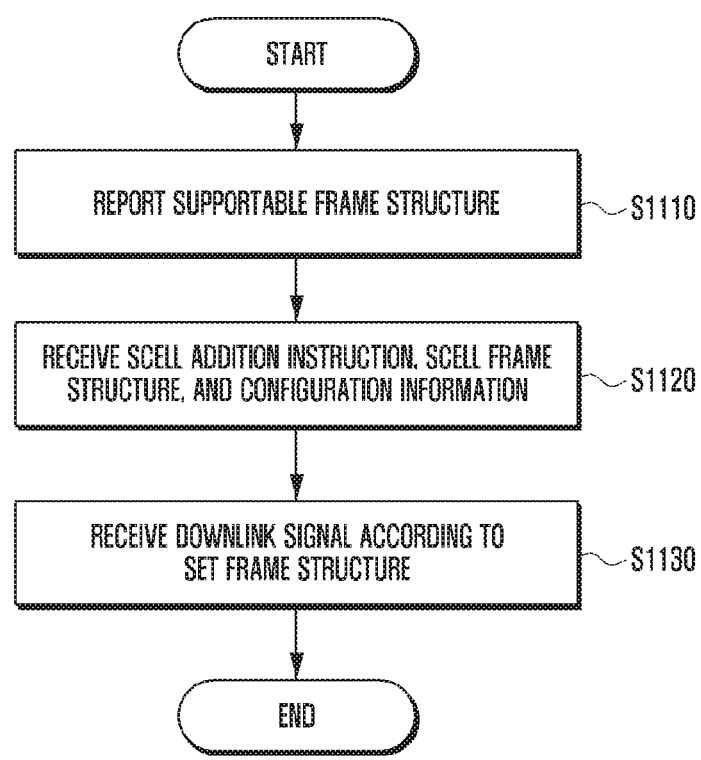
FIG. 11 is a flow diagram illustrating a method for a terminal to receive a downlink signal, based on a set frame structure.

FIG. 11 is a flow diagram illustrating an operation of a terminal according to an embodiment of the present invention. At step S1110, the terminal may report its capability information to a base station. At this time, the terminal capability information may include a frame structure supportable by the terminal. At step S1120, the terminal that is instructed to add SCell by the base station adds and sets the SCell according to configuration information that is set for the Scell by the base station. At step S1130, the terminal receives the downlink data channel from the base station by using the frame structure set at step S1120. If another control signal (e.g., CRS) is detected even if PSS and SSS signals are not detected in SF0 and SF5, the terminal set with the third frame structure may continuously communicate with the SCell. In addition, the terminal set with the third frame structure may determine whether a control signal including CRS, PCFICH, or the like is transmitted for each subframe, thereby determine whether the SCell transmits a downlink signal, and perform an operation of receiving a downlink data channel.

If a control channel indicating the number of OFDM symbols to be used for downlink signal transmission in the next subframe (subframe n+1) of the Scell is received in the subframe n through the downlink control channel of the Scell, the terminal set with the third frame structure may perform an operation of receiving a downlink data channel without determining whether a control signal including CRS, PCFICH, etc. is transmitted in the subframe n+1 and thereby determining whether the SCell transmits a downlink signal.

For example, if the frequency band set for the SCell by the base station is the licensed band, the terminal set with the third frame structure may perform an operation of receiving a downlink data channel without determining whether the base station transmits a control signal including CRS, PCFICH, etc., and thereby determining whether the SCell transmits a downlink signal.

Figure 12:
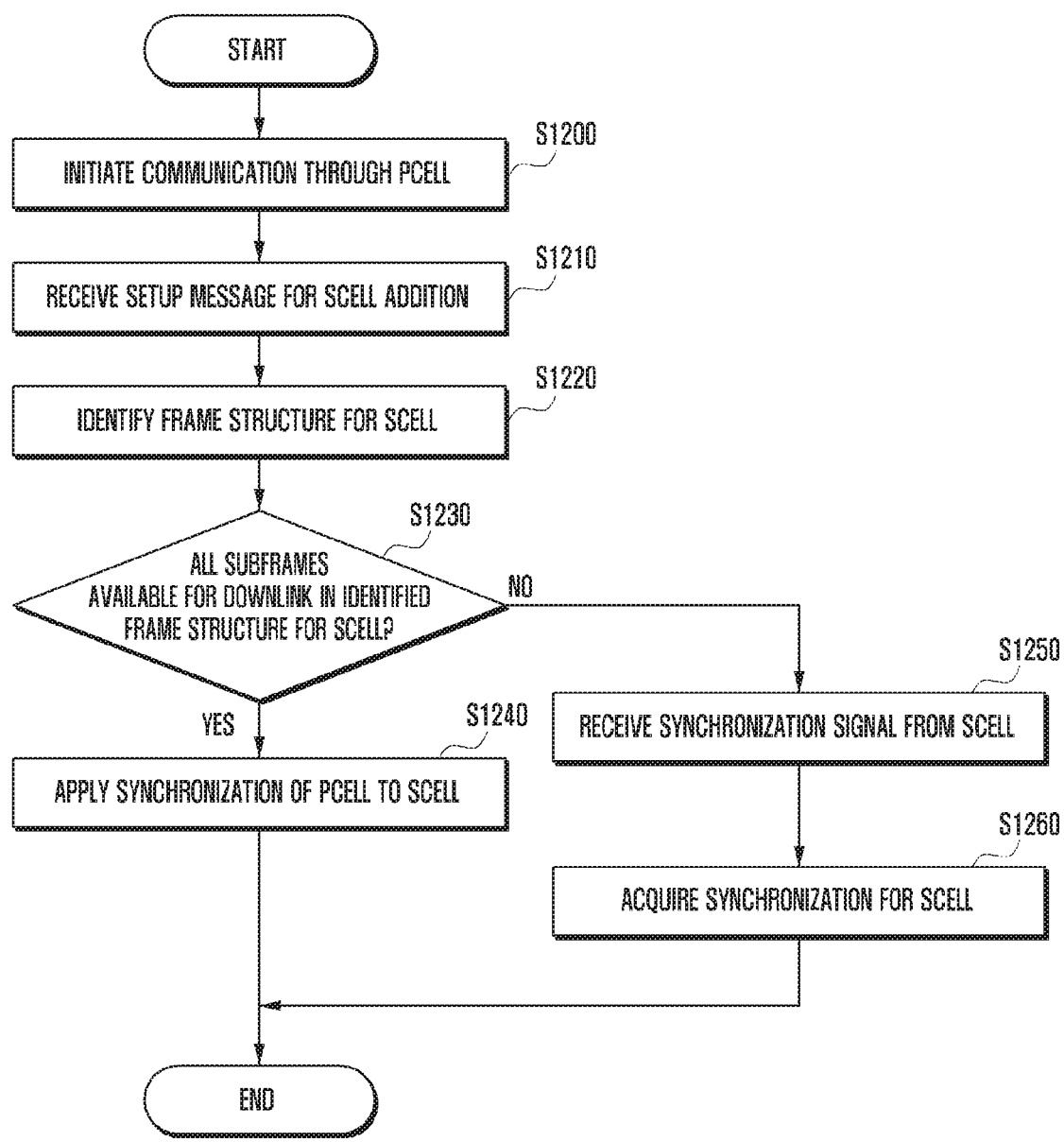
FIG. 12 is a flow diagram illustrating a method for a terminal to acquire cell synchronization, based on a set frame structure.

Meanwhile, FIG. 12 is a flow diagram illustrating a method for acquiring SCell synchronization at a terminal according to an embodiment of the present invention.

First, at step S1200, the terminal may initiate communication through PCell. The terminal may receive setup of the PCell from a connected base station. For example, the base station may set the PCell of a TDD structure to the terminal.

At step S1210, the terminal may receive a setup message for adding SCell from the base station. For example, if the base station determines that additional bandwidth setup is required for the terminal, the base station may further set SCell to the terminal. At this time, the base station may further set the SCell in the unlicensed band or the licensed band.

At step S1220, the terminal may identify a frame structure of the additionally set SCell. In addition, at step S1230, the terminal may determine whether the identified frame structure of the SCell allows all subframes to be used as a downlink subframe.

If it is determined that the identified frame structure of the SCell allows all subframes to be used as the downlink subframe, the terminal may apply the synchronization of the PCell to the SCell at step S1240.

On the other hand, if it is determined that the identified frame structure of the SCell does not allow all subframes to be used as the downlink subframe, the terminal may receive a synchronization signal in SCell at step S1250. For example, if the frame structure for SCell is a TDD frame structure, the terminal may receive the synchronization signal such as PSS and SSS in the downlink subframe of the TDD frame structure. Then, at step S1260, the terminal may acquire synchronization for the SCell.

Figure 13:
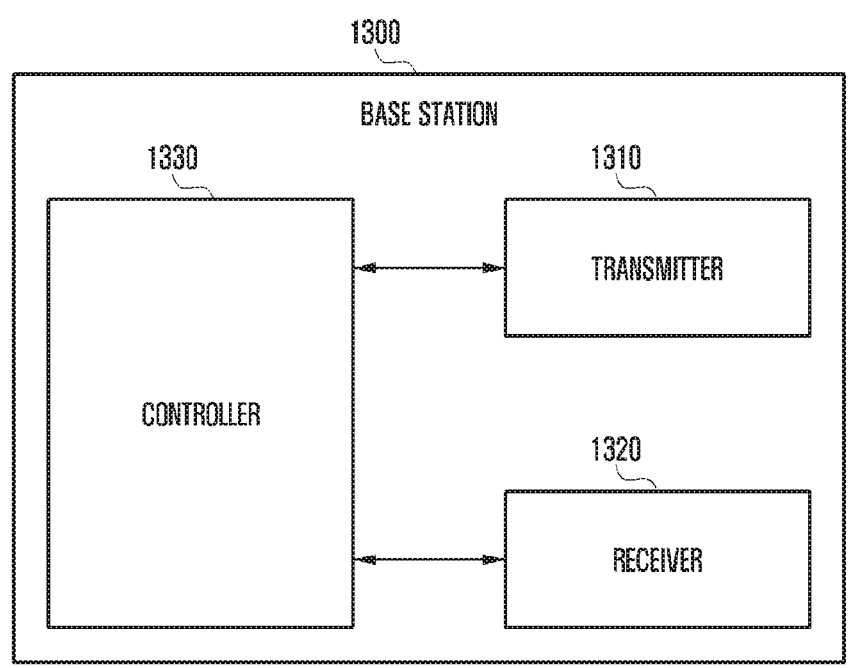
FIG. 13 is a block diagram illustrating elements of a base station according to an embodiment of the present invention.

FIG. 13 is a diagram of a base station 1300 according to an embodiment of the present invention.

A receiver 1310 of the base station may include a function of receiving a signal from another base station, a terminal, etc., or measuring a channel between base stations and a channel between a base station and a terminal. A controller 1330 of the base station 1300 may determine a supportable frame structure of a terminal by using the characteristics or supportable function information of the terminal received at the receiver 1320. If the supportable frame structure of the terminal is different for each terminal, the controller 1330 of the base station 1300 may set base station configuration information including the frame structure of the base station differently for each terminal and transmit it at a transmitter 1310 of the base station 1300. If it is set to operate one or more frame structures, the controller 1330 of the base station 1300 may set downlink transmission configuration differently to each terminal according to the frame structure set to each terminal, the base station configuration information, and the unique characteristics of the frame structure.

Figure 14:
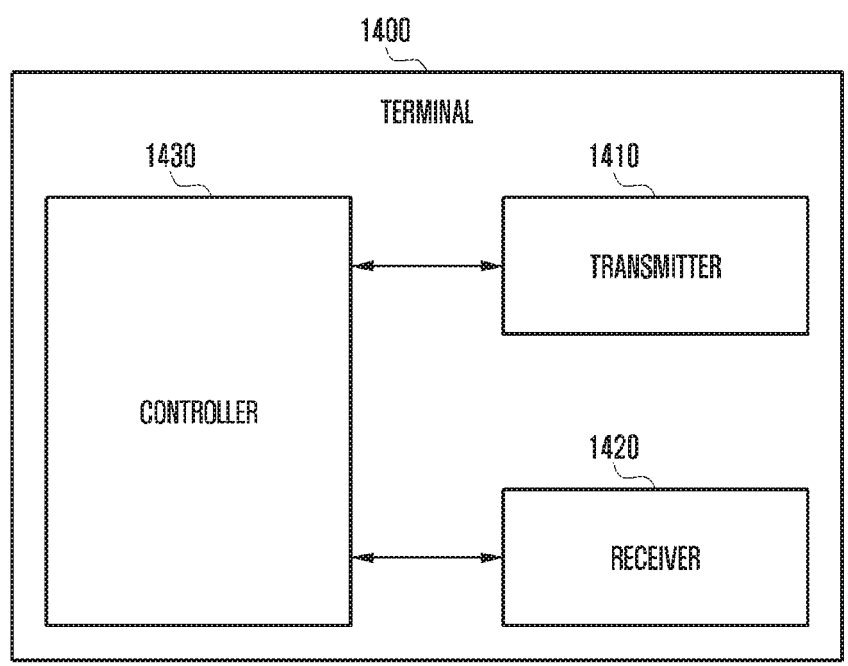
FIG. 14 is a block diagram illustrating elements of a terminal according to an embodiment of the present invention.

FIG. 14 is a diagram of a terminal 1400 according to an embodiment of the present invention.

In FIG. 14, a controller 1430 of the terminal 1400 may transmit to a base station, using a transmitter 1410, information including functions supported by the terminal 1400 or the characteristics of the terminal 1400 such as a supportable frame structure. Then, the terminal 1400 may receive from the base station, using a receiver 1420, SCell configuration information including SCell addition instructions and a frame structure of the Scell, and the controller 1430 may add the SCell instructed to be added by the base station. In addition, the controller 1430 of the terminal 1400 sets the SCell frame structure and the SCell configuration according to setting of the base station. Then, the terminal 1400 receives a downlink signal through the receiver 1420 according to the frame structure of the SCell.

The invention claimed is:

1. A scheduling method by a base station in a wireless communication system, the method comprising:
receiving a message including capability information from a first terminal and a second terminal;
transmitting, to the first terminal, first configuration information for adding a first secondary cell (scell), the first configuration information including information on a first frame structure, based on the capability information;
transmitting, to the second terminal, second configuration information for adding a second scell, the second configuration information including information on a second frame structure, based on the capability information, wherein the first scell and the second scell are different scells; and
allocating resources to the first terminal cell and the second terminal,
wherein subframes of the second frame structure include only downlink subframes, only uplink subframes, or only empty subframes,
wherein allocating the resources comprises:
transmitting a signal to the second terminal in the subframes of the second frame structure on the second scell, in case that the subframes of the second frame structure include the downlink subframes; and
allocating no resource to the second terminal, for resources to which at least one of a synchronization signal and a physical broadcast channel (PBCH) are allocated to the first terminal, and wherein an uplink resource is not allocated to the first terminal in an uplink subframe of the first frame structure on the first scell, in case that the subframes of the second frame structure includes only downlink subframes and the first frame structure corresponds to the subframes of the second frame structure in a time domain.

2. The method of claim 1, wherein the first frame structure comprises a time division duplex (TDD) frame structure.

3. The method of claim 1, wherein
the capability information of the second terminal includes information on a frame structure supportable by the second terminal.

4. A base station in a wireless communication system, comprising:
a transceiver; and
a controller configured to:
control the transceiver to receive a message including capability information from a first terminal and a second terminal,
control the transceiver to transmit, to the first terminal, first configuration information for adding a first secondary cell (scell), the first configuration information including information on a first frame structure, based on the capability information,
control the transceiver to transmit, to the second terminal, second configuration information for adding a second scell, the second configuration information including information on a second frame structure, based on the capability information, wherein the first scell and the second scell are different scells, and
allocate resources to the first terminal and the second terminal,
wherein subframes of the second frame structure include only downlink subframes, only uplink subframes, or only empty subframes,
wherein the controller is further configured to:
control the transceiver to transmit a signal to the second terminal in the subframes of the second frame structure on the second scell, in case that the subframes of the second frame structure include the downlink subframes, and
allocate no resource to the second terminal, for resources to which at least one of a synchronization signal and a physical broadcast channel (PBCH) are allocated to the first terminal, and
wherein an uplink resource is not allocated to the first terminal in an uplink subframe of the first frame structure on the first scell, in case that the subframes of the second frame structure includes only downlink subframes and the first frame structure corresponds to the subframes of the second frame structure in a time domain.

5. The base station of claim 4, wherein the first frame structure comprises a time division duplex (TDD) frame structure.

6. The base station of claim 4, wherein the capability information of the second terminal includes information on a frame structure supportable by the second terminal.

7. A method of a second terminal in a wireless communication system, the method comprising:
transmitting, to a base station, a message including capability information;
receiving, from the base station, configuration information for adding a secondary cell (scell), the configuration information including information on a second frame structure in which subframes include only downlink subframes, only uplink subframes, or only empty subframes, based on the capability information; and
receiving a signal on the scell,
wherein receiving the signal comprises:
receiving a signal in the subframes of the second frame structure in case that the subframes of the second frame structure includes the downlink subframes,
wherein an uplink resource is not allocated to a first terminal in an uplink subframe of a first frame structure on a first scell configured to the first terminal, in case that the subframes of the second frame structure includes only downlink subframes and the first frame structure corresponds to the subframes of the second frame structure in a time domain,
wherein the first scell and the second scell are different scells, and
wherein resources are not allocated to the second terminal for resources to which at least one of a synchronization signal and a physical broadcast channel (PBCH) are allocated to the first terminal.

8. The method of claim 7, wherein the first frame structure and the second frame structure include at least one of a time division duplex (TDD) frame structure or a frequency division duplex (FDD) frame structure.

9. The method of claim 7, wherein
the capability information of the second terminal includes information about a frame structure supportable by the second terminal.

10. A second terminal in a wireless communication system, comprising:
a transceiver; and
a controller configured to:
control the transceiver to transmit, to a base station, a message including capability information,
control the transceiver to receive, from the base station, configuration information for adding a secondary cell (scell), the configuration information including information on a second frame structure in which subframes include only downlink subframes, only uplink subframes, or only empty subframes, based on the capability information, and
control the transceiver to receive a signal on the scell,
wherein the controller is further configured to control the transceiver to receive a signal in the subframes of the second frame structure in case that the subframes of the second frame structure includes the downlink subframes,
wherein an uplink resource is not allocated to a first terminal in an uplink subframe of a first frame structure on a first scell configured to the first terminal, in case that the subframes of the second frame structure includes only downlink subframes and the first frame structure corresponds to the subframes of the second frame structure in a time domain,
wherein the first scell and the second scell are different scells, and
wherein resources are not allocated to the second terminal for resources to which at least one of a synchronization signal and a physical broadcast channel (PBCH) are allocated to the first terminal.

11. The second terminal of claim 10, wherein the first frame structure and the second frame structure include at least one of a time division duplex (TDD) frame structure or a frequency division duplex (FDD) frame structure.

12. The second terminal of claim 10, wherein the capability information of the second terminal includes information on a frame structure supportable by the second terminal.

\* \* \* \* \*